United States Patent
Reichhart

(10) Patent No.: US 8,437,022 B2
(45) Date of Patent: May 7, 2013

(54) ORDER SYSTEM FOR PRINTED MATTER, AND METHOD FOR CALCULATING PRODUCTION OF PRINTED MATTER

(75) Inventor: Thomas Reichhart, Aldenhoven (DE)

(73) Assignee: Hewlett-Packard Gesellschaft M.B.H., Vienna (AT)

(*) Notice: Subject to any disclaimer, the term of this patent is extended or adjusted under 35 U.S.C. 154(b) by 879 days.

(21) Appl. No.: 12/442,628

(22) PCT Filed: Sep. 19, 2007

(86) PCT No.: PCT/EP2007/008147
§ 371 (c)(1),
(2), (4) Date: Mar. 24, 2009

(87) PCT Pub. No.: WO2008/037385
PCT Pub. Date: Apr. 3, 2008

(65) Prior Publication Data
US 2010/0277758 A1 Nov. 4, 2010

(51) Int. Cl.
*G06F 3/12* (2006.01)
*G06K 15/00* (2006.01)
*G06K 15/02* (2006.01)
*G06F 15/16* (2006.01)

(52) U.S. Cl.
USPC ........... 358/1.15; 358/1.1; 358/1.2; 358/1.12; 358/1.14; 358/1.16; 709/201; 705/408

(58) Field of Classification Search ............... None
See application file for complete search history.

(56) References Cited

U.S. PATENT DOCUMENTS

| | | | | |
|---|---|---|---|---|
| 5,822,510 A | * | 10/1998 | LeClair et al. | 358/1.16 |
| 6,012,070 A | * | 1/2000 | Cheng et al. | 715/234 |
| 6,981,015 B1 | * | 12/2005 | Palmer et al. | 709/201 |
| 7,242,490 B1 | * | 7/2007 | Palmer et al. | 358/1.15 |
| 2003/0061178 A1 | * | 3/2003 | Ogawa | 705/408 |
| 2003/0169446 A1 | * | 9/2003 | Grohs et al. | 358/1.15 |
| 2004/0019538 A1 | | 1/2004 | Ballas et al. | |
| 2004/0061899 A1 | * | 4/2004 | Kimura | 358/1.16 |
| 2005/0162670 A1 | * | 7/2005 | Shuler | 358/1.2 |
| 2006/0197977 A1 | | 9/2006 | Miyata | |
| 2007/0177191 A1 | * | 8/2007 | Eschbach et al. | 358/1.15 |
| 2009/0040554 A1 | * | 2/2009 | Burke et al. | 358/1.15 |

FOREIGN PATENT DOCUMENTS

| | | |
|---|---|---|
| EP | 1 197 837 A2 | 4/2002 |
| EP | 1 531 610 A2 | 5/2005 |

* cited by examiner

*Primary Examiner* — Satwant Singh

(57) ABSTRACT

The invention discloses an order system for printed matter, where printed matter is defined in an article-based database in the order system and an order for the production of the printed matter is using an interface in the order system, and a method for calculating production of printed matter, where first an interface in such an order system is used to give an order for production and where, when the order has been given, parameters for the printed matter are taken as a basis for using a calculation module in a Management Information System controlling networked graphical production to calculate the production and in order to trigger the automated calculation when an order has been given using an article-based order system, it is proposed that production-specific parameters for the printed matter be able to be defined in the order system's database and that, when the order has been given, the order system provide the parameters for calculating production of the printed matter via an interface.

10 Claims, No Drawings

ORDER SYSTEM FOR PRINTED MATTER, AND METHOD FOR CALCULATING PRODUCTION OF PRINTED MATTER

BACKGROUND OF THE INVENTION

The invention relates, on the one hand, to an ordering system for print products, wherein a print product can be defined in an article oriented database of the ordering system and a job order to produce a print product can be issued by means of a user interface of the ordering system, and, on the other hand, the invention relates to a method for costing the production of a print product, wherein a job order for production is issued by means of an interface of such ordering system, and wherein after issue of the job order, the production of the print product is costed based on parameters of the print product by means of a costing module of a Management Information System, which controls a networked graphic production.

Ordering systems, as described above, are generally known and increasingly provided to potential customers through user interfaces configured as internet portals. The actual ordering system is implemented as a database application on a computer connected to the internet. In the database, the particular articles, which can be ordered through the ordering system, are listed with their respective prices and possibly with additional specific information, like e.g. arithmetic cost estimation, the respective inventory, external sources or internal production lead times.

Through the ordering system, a customer selects one or plural print products, defines the respectively required print-runs and issues the job order through a respective button in the user interface. The job order is transmitted to the database application, where it is processed possibly in an automated manner. For example, a request for ordered print products can be automatically transmitted to the warehouse, a shipping ticket and an invoice for the customer can be automatically generated, in particular, the job order is transmitted to production in order to produce print products which are not in inventory.

In modern graphic production shops, the prepress-, press- and post press systems, used for the production of print products, down to the packaging systems and loading systems, are networked. The various execution systems communicate amongst one another and with a central controlling Management Information System (MIS) in Job Definition Format (JDF).

JDF is a generally known format, which was developed and is being maintained by the Consortium "International Cooperation for the Integration of Processes in Prepress, Press and Postpress" (CIP4-Consortium, www.cip4.org). The development of JDF is based on the objective to standardize communications between print shop, designer, advertising agency, customer of print products and subcontractor of contractors in the context of a networked graphic production for all production options and eventualities in a flexible manner and without restrictions.

According to the intention of the CIP4-Consortium, JDF is to be used as a standard data format for describing processes and products, not only in all production areas of a networked print shop, in particular, in sales, job costing and job processing, production planning and control, in actual production in prepress, press, and postpress and shipping, in the cross sectional areas materials- and warehouse management, financial- and payroll accounting, controlling, cost accounting, and quality assurance.

In a JDF file, a job shall only be described once in one format, which is understood by all process partners, over language- and platform boundaries in external communications by customers and subcontractors and their execution systems in the man-machine and machine-machine communication. Through the vertical integration of data, on the one hand, of the production process, and, on the other hand, of the commercial departments in a comprehensible and integrated data structure, JDF facilitates a high level of transparency of all production processes, a standardized documentation of the relevant target and actual data and an integrated production control.

A prerequisite for the automated costing and production of the ordered print products on JDF based network execution systems is the basic description of a job defined in the article based database in the central MIS. Since the description of the job in JDF requires production specific data, which cannot be stored in the article based databases of the known ordering systems, said definition of the job is performed manually in the state of the art MIS.

OBJECT OF THE INVENTION

Summary of the Invention

Based on the known ordering systems, it is proposed according to the invention that production specific parameters of the print product can be defined in the database, and that the ordering system provides the parameters for costing the production of a print product through an interface after a job order has been issued. The ordering system according to the invention initially facilitates describing a job according to the job costing parameters and facilitates automated transmission of said parameters to an MIS through providing an interface for set parameters in order to initiate the automated costing of the job in the MIS. The invention establishes a connection between the worlds of the article based job order and of the production of the print product controlled by said parameters.

Preferably, a parameter of the print product can be defined in the database as a reference to a similar parameter of another print product. Parameters for the production of print products are stored in the known MIS in the context of internal databases. The reference to a parameter of another print product, which has already been costed, on the one hand, simplifies the definition of the parameters.

In an ordering system according to the invention, a group of parameters of the print product can preferably be defined in the database as a reference to a group of same type parameters of another print product. The possible parameters of print products are not only versatile, but they can also assume an unmanageable multitude of actual values. However, in actual applications, only comparatively few combinations of parameters are useful for producing actual print products. The reference to existing groups of parameters materially accelerates the definition of the parameters of a print product and, on the other hand, systematically assures their consistency.

In the context of an ordering system according to the invention, the reference can be directed to a data structure disposed outside of the database of the ordering system in a particular preferred manner, wherein said data structure comprises the parameters of the other print product. A reference to an existing, archived job costing of another print product is preferred in particular, wherein said job costing includes all parameters required for costing the other print product.

In an ordering system according to the invention, furthermore, preferably the reference within the data structure can be directed to a selected parameter or to a selected group of parameters. Thus, particular parameters or specified groups of parameters of the print product can be selectively defined.

In a particularly advantageous embodiment of an ordering system according to the invention, the reference can be defined as an output value of a decision module. Such a decision module can select one reference out of plural possible references as an output value, e.g. based on the actual value of one or plural parameters of the print product, e.g. the print-run, the requested delivery date, the coloring, the paper format, the paper grade or one or plural other parameters, e.g. the customer- or the delivery address, the suggested format of the printer's copies and the delivery type. Such a decision module, which is not installed in the database, but e.g. in the MIS, facilitates the adaptation, e.g. when introducing a new execution system in the graphic shop. In a particularly preferred manner, the reference for a plurality of print products can be determined by means of such a decision module.

Based on the known methods for costing the production of a print product, it is proposed according to the invention that the parameters are provided by the interface of an ordering system according to the invention and that the production is automatically costed. The method according to the invention links an article based ordering system in a particularly simple manner to the parameterized costing, in particular, in a MIS of a networked graphic production.

Preferably, the parameters are automatically transmitted to the costing module in the context of the method according to the invention after the job order has been issued. Thus, the costing of the job can be directly initiated by the issuance of the job order. In another advantageous embodiment of the method according to the invention, the print product is initially automatically associated based on its parameters with at least one gang form after the job order has been issued, and the parameters of the gang form resulting from the association are automatically transmitted to the costing module. Gang forms used for the production of print products are frequently archived for later use after a job has been produced. Such method according to the invention specifically facilitates the reuse of said gang forms and thus avoids recurring cost.

DETAILED DESCRIPTION OF PREFERRED EMBODIMENTS

The invention is subsequently described with reference to an embodiment. In a web interface of an ordering system according to the invention for print products, different print products can be selected. For example, postcards in the "standard size" DIN A6, "long" in the format DIN C6, "large" in the format DIN A5 can be selected. Each of said formats can also be selected as "fold card", thus in double size, and folded along the short or along the long edge or as a "leporello" with up to five times the format. The paper can be selected from four different surface grades with three respective grammages each, additionally an appropriate envelope can be selected for each card, and an imprint can be defined on the front page or on the flap for this purpose. Under various article numbers respective print-runs of 50 pieces can be defined as a "small print-run", of 500 pieces and with more than 5,000 pieces, it can be defined as a "large print-run" with a variable number of pieces.

Under another article number, e.g., a display stand made of cardboard in Leporello fold can be selected, wherein the completely unfolded format can be selected between DIN A4 and DIN A0. Optionally, laterally unfoldable triangular supports can be selected for formats of DIN A3 and larger. The display stand can be ordered with a minimum print-run of 50 pieces, irrespective of its format.

In the database of the ordering system, a reference to parameter definitions in the costing archive of the MIS of a JDF-networked graphic production shop is stored for each article. All references for the postcards refer to the same decision module, which processes the values of the parameters of the respectively ordered article and which selects an appropriate parameter set. The reference to the display stand refers to another decision module.

When ordering a print product through the web portal, the description of the respective article is transmitted in the form of a reference to an archived job costing, together with the actual parameters of the print product, from the database to a URL, particularly created for this purpose, (Unified Resource Locator, Internet address) of the MIS of the graphic production shop. Subsequently, a decision module for preparing the job costing is automatically called up in the MIS.

The start variable of the decision module for the postcards refers to different archived job costings in the job costing archive of the MIS, depending on the constellation of the parameters. Postcards in "normal size" with a print-run of overall less than 500 pieces are e.g. jointly produced in gang forms together with other jobs as far as possible, only when the gang forms are filled by at least 70%, they are costed overall.

For folding cards, on the other hand, specific job costings are available in almost all provided formats. For folding cards, not only the parameters of the print product are taken over, which are required as input values of the job costing, but also the definitions, which were already computed or manually determined in the existing job costings for the product components to be manufactured in intermediary steps and the complete definition of the print sheet and the finishing. Additionally, the actually desired total print-run and the paper quality are inserted as variables with the value of the current job, and stored under a new job costing number, issued by the MIS upon request.

The job costing module of the MIS under this job costing number only additionally performs the final computation for the production of the ordered print product in the graphic print shop, including the actual loading of the execution systems, and thus the cost associated therewith. Based on the job costing thus performed, a new job is subsequently created under a new job number which is also issued by the MIS upon request; the technical workflow is described in a JDF file and transmitted to a scheduling module, therein supplemented with actual deadlines and subsequently transmitted to the execution systems in production. Based on the article list, the volumes and prices from the job order and possibly considering the feedbacks from the execution systems, the MIS eventually creates a shipping ticket and an invoice for the business workflow.

For the 4- and 5-page leporello in folded format A5, which was not previously manufactured in the present graphics shop, only the appropriate parameters of the print product are taken over from an archived job costing for a respective 3-page Leporello, and supplemented with the new format definition, and like with the folded cards, supplemented with the print-run and the paper grade. Based on these variables, initially the product components and the definition of the print sheet and of the finishing are computed in the cost estimation module, reworked manually where necessary, and the final computation of the job costing is performed on this basis.

The decision modules furthermore also consider as far as defined particular customer specific specifications, like e.g. discount agreements or the use of paper provided by the customer. Such parameters are also taken over from the job order and considered by the job costing module of the MIS, in as far as they relate to costs and prices.

What is claimed is:

1. An ordering system for print products, wherein a print product is to be defined in an article based database of the ordering system and a job order to produce the print product is to be issued through a user interface of the ordering system,
    wherein production specific parameters of the print product is to be defined in the database and the ordering system provides the parameters to a costing module for costing the production of the print product through an interface after the job order is issued, and
    wherein a parameter of the print product is to be defined in the database of the ordering system as a reference to a parameter of the same type of another print product located in a data structure disposed outside of the database of the ordering system.

2. The ordering system according to claim 1, wherein a group of parameters of the print product is to be defined as a reference to a group of parameters of the same type of another print product.

3. The ordering system according to claim 1, wherein said data structure has the parameters of the other print product.

4. The ordering system according to claim 3, wherein the data structure includes all parameters necessary for costing the other print product.

5. The ordering system according to claim 3, wherein the reference is to be made from the database of the ordering system to a specified parameter or to a specified group of parameters in the data structure.

6. The ordering system according to claim 1, wherein the reference is to be defined as a start value of a decision module.

7. The ordering system according to claim 6, wherein the reference is for a plurality of print products and determined by the decision module.

8. A method for costing the production of a print product, wherein a job order for production is initially issued through a user interface of an ordering system and wherein after issuing the job order, the production is costed based on parameters of the print product by a costing module of a Management Information System controlling a networked graphic production, wherein production specific parameters of the print product is to be defined in a database of the ordering system, and the ordering system provides the parameters for costing the production of the print product through an interface after the job order is issued, and the production is costed automatically, and wherein a parameter of the print product is to be defined in the database as a reference to a parameter of the same type of another print product located in a data structure disposed outside of the database of the ordering system.

9. The method according to claim 8, wherein the parameters are automatically transmitted from the ordering system to the costing module after the job order is issued.

10. The method according to claim 8, wherein the print product is initially automatically associated with at least one form based on the parameters of the print product, after the job order is issued, and parameters of the form resulting from the association are automatically transmitted to the costing module.

* * * * *

UNITED STATES PATENT AND TRADEMARK OFFICE
CERTIFICATE OF CORRECTION

| | | |
|---|---|---|
| PATENT NO. | : 8,437,022 B2 | Page 1 of 1 |
| APPLICATION NO. | : 12/442628 | |
| DATED | : May 7, 2013 | |
| INVENTOR(S) | : Thomas Reichhart | |

It is certified that error appears in the above-identified patent and that said Letters Patent is hereby corrected as shown below:

In the specification

In column 2, line 22, delete "OBJECT OF THE INVENTION" and insert -- It is the object of the invention to initiate automated job costing by issuing a job order by means of an article based ordering system. --, therefor.

Signed and Sealed this
First Day of December, 2015

Michelle K. Lee
*Director of the United States Patent and Trademark Office*